STORE FRONT STRUCTURE

Original Filed May 10, 1957 4 Sheets-Sheet 1

INVENTOR.
HARRY L. OWEN.
BY
Eugene C. Knobloch
ATTORNEY.

STORE FRONT STRUCTURE
Original Filed May 10, 1957 4 Sheets-Sheet 2
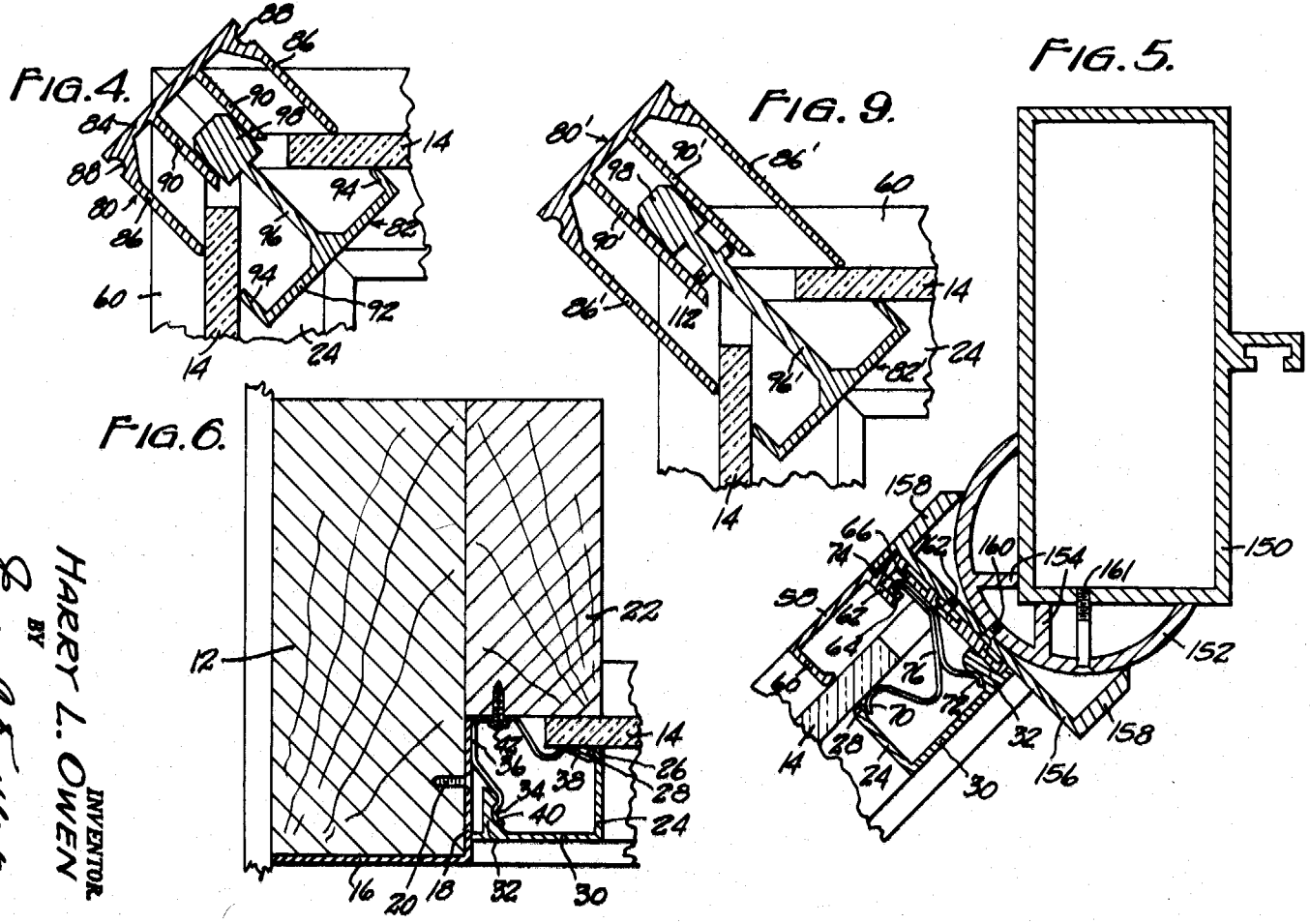
INVENTOR.
HARRY L. OWEN
BY
Eugene C. Kaublock
ATTORNEY.

STORE FRONT STRUCTURE
Original Filed May 10, 1957 4 Sheets-Sheet 3
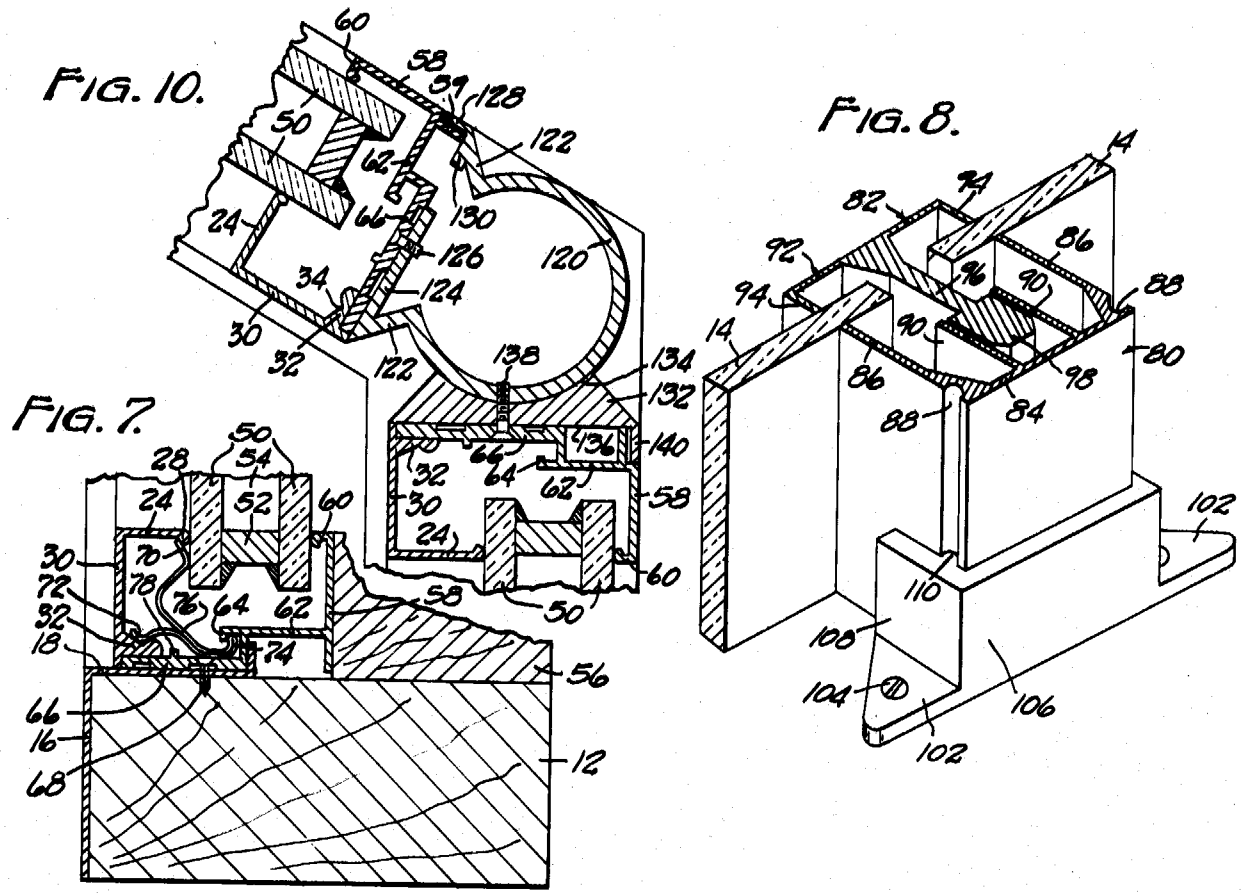
INVENTOR.
HARRY L. OWEN.
BY
Eugene C. Knobloch
ATTORNEY.

INVENTOR.
HARRY L. OWEN.
BY
Eugene C. Knoblock
ATTORNEY

United States Patent Office

Re. 25,030
Reissued Aug. 22, 1961

25,030
STORE FRONT STRUCTURE

Harry L. Owen, Niles, Mich.

Original No. 2,917,793, dated Dec. 22, 1959, Ser. No. 658,364, May 10, 1957. Application for reissue Feb. 24, 1960, Ser. No. 10,826
6 Claims. (Cl. 20—56.3)

Matter enclosed in heavy brackets [ ] appears in the original patent but forms no part of this reissue specification; matter printed in italics indicates the additions made by reissue.

This invention relates to improvements in store front structures, and more particularly to structures by means of which store windows may be mounted in a building.

The primary object of this invention is to provide a device of this character which provides a proper and safe setting for glass panels of the plate and spaced plate assembly types.

A further object is to provide a structure of this character which permits rapid and simple installation, which presents an attractive architectural appearance, which permits the use of standard sizes of lumber in the building structure to which the store front structure is to be secured, which is water-tight, which is of minimum cost consistent with required strength and rigidity of construction, and which requires a minimum number of constituent elements to produce a store front structure of any desired design, set back, recessing or general appearance.

A further object is to provide a store front structure in which sash and division, corner and reverse corner bars are so designed that the glass retained thereby is free to rock within the setting to insure safe setting of the glass therein.

A further object is to provide a device of this character in which securing screws are concealed at both the outer and inner sides of the sash.

A further object is to provide a store front construction in which the elements or parts are so constructed that they fit together attractively with butt edges and joints and without the need for mitering abutting ends if such mitering is not desired.

Other objects will be apparent from the following specification.

In the drawings:

FIG. 4 is an enlarged horizontal sectional detail view taken on line 4—4 of FIG. 1;

FIG. 5 is an enlarged horizontal detail sectional view taken on line 5—5 of FIG. 1;

FIG. 6 is an enlarged horizontal detail sectional view taken on line 6—6 of FIG. 1;

FIG. 7 is an enlarged vertical detail sectional view taken on line 7—7 of FIG. 1;

FIG. 8 is a fragmentary perspective view of a part of the costruction shown in FIG. 2;

FIG. 9 is an enlarged horizontal detail sectional view similar to FIG. 4 but illustrating a modified form of the construction;

FIG. 10 is an enlarged horizontal sectional view taken on line 10—10 of FIG. 1;

Figure 1:
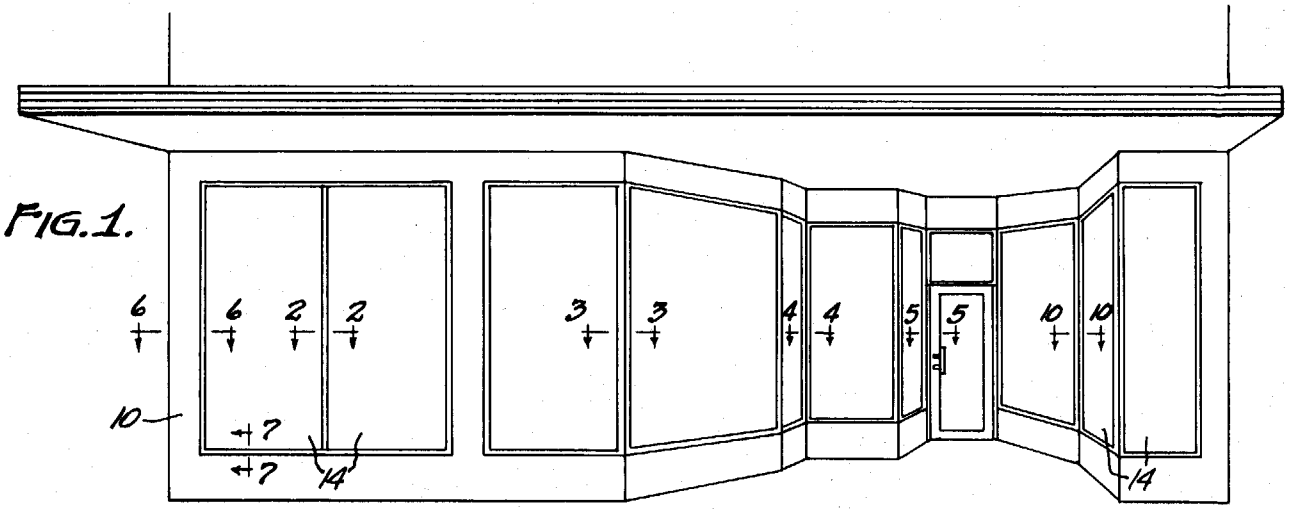
FIG. 1 is a front perspective view of a store front embodying my invention.

Referring to the drawings which illustrate the preferred embodiments of the invention, the numeral 10 designates the front of a building having structural members, such as two-by-fours 12, outlining the window opening at the front of the building within which one or more glass panels 14 are to be mounted. Angle members are secured to the structural members 12 as illustrated in FIGS. 6 and 7, being preferably provided with a leg 16 which forms the facing for the structural member 12, and an angularly extending leg 18 bearing against the surface of the member 12 which outlines the window opening. Suitable securing means, such as screws 20 as illustrated in FIG. 6, may be employed to anchor the angle members in place to surround the window opening.

The manner in which the vertical sash may be arranged to anchor plate glass panel 14 is illustrated in FIG. 6 and entails the use of a marginal trim strip 22 nailed or otherwise secured to the structural member 12 to provide an abutment for the margin of the glass panel 14. A sash face member of angle shape in cross-section is applied to the outer face of the glass panel as illustrated in FIG. 6. This sash face member preferably includes a leg 24 having a rounded glass-engaging edge 26 and a longitudinal inwardly projecting lip 28. A second leg 30 projects perpendicularly from leg 24 and substantially parallel to the glass panel 14 and is adapted to bear against the leg 18 of the angle member as shown. The leg 30 has a longitudinal table or flange 32 extending lengthwise thereof and perpendicular thereto for a substantial width and has a longitudinal groove 34 in the face of said flange 32. Note that the flange 32 is spaced from the free edge of the leg 30 at a slight distance compared to its spacing from the leg 24. The face sash is anchored by means of leaf springs which preferably have a central portion 36 adapted to seat against the parts 18 and 22, and has an end portion or lip 38 adapted to engage behind the lip 28 of the channel leg 24 and an opposite end part 40 seating in groove 34 of table 32. The spring member will be anchored at its central portion 36 as by means of the securing member 42. The sash face member is preferably installed by engaging the lip 28 thereof behind the spring lip 38 and then pressing inwardly against the free end of the leg 30 to cause the table 32 to engage behind the lip end portion 40 of the spring.

FIG. 7 illustrates a sash member constructed of two parts and, as shown, being adapted for use with a window having two spaced panels 50 marginally connected and sealed by a spacer 52 to define a sealed dead air insulating space 54 between the panels. The two-part sash preferably seats against the two-by-four or other structural member 12 and, as shown, bears upon the leg 18 of the angle member 16. A molding or trim member 56 may be secured to the structure member 12 to form an abutment or shoulder against which bears the wall or flange 58 of the inner member of the sash, and the upper end of which has a perpendicularly extending flange 60 against which the inner face of the inner glass panel 50 is adapted to bear at its margin. A table portion 62 projects outwardly from the wall member or flange 58 intermediate its height and terminates in a hook portion 64. A base portion 66 is outwardly offset from table 62 to project outwardly in engagement with the flange 18 of the angle member 16 and is preferably provided with a plurality of longitudinal grooves at its lower face, as illustrated. Securing screws 68 serve to anchor the base 66 of the inner member of the sash to the building structure, as to the structure member 12.

The outer member of the sash is of the same construction as described above with reference to the sash member shown in FIG. 6, and the same reference numerals used therein refer to the parts of the outer member of the sash shown in FIG. 7. The spring means which serve to anchor the outer member of the sash are of somewhat different construction than that shown in FIG. 6 and include an end portion 70 for engagement with the inner lip 28 of the outer member of the sash, an opposite end portion 72 adapted to seat in the groove 34 of the table portion or flange 32 of the outer member of the sash, and a hook member 74 engaging with the hook 64 of the table 62 and serving as the means to hold the spring unit 76 in position with respect to the inner member of the sash.

Observe that the edge of the flange 60 is of rounded contour so that the glass is gripped by rounded surfaces, which contributes to the ease of "rocking" glass which is necessary for the safe setting of plate glass and double panel units to insure that tensions and pressures will not be applied thereto in such a manner as to damage the glass. Note that the flange 60 of the inner member of the sash is substantially coplanar with the flange 24 of the outer member of the sash, giving to the assembled sash a flat appearance which eliminates depressions which would constitute a gutter. This arrangement also facilitates arrangement of the sash members with the vertical parts butted between the top and bottom horizontal parts at their ends. This eliminates the need for cap members and also avoids the need for miters. A rib 78 may be formed on the inner face of the base 66 of the inner member of the sash to serve to guide the placing of setting blocks and to help in holding them in position while the glass is being set in the sash. Grooves at the bottom surface of the member 66 reduce the weight of the unit without sacrifice of strength and also serve to assist in preventing water from working its way between the base 66 and the member which it abuts.

The use of a two-part sash to anchor a single glass panel is illustrated in FIG. 5. In this instance the parts bear the same numerals applied to the sash member in FIG. 7, although comparable parts have been somewhat differently dimensioned as required to accommodate the narrower width of the single glass panel 14 compared to the width of the spaced double glass panel structure accommodated by the construction in FIG. 7.

It is usually necessary to employ a plurality of glass panels to construct a store front by reason of the desire to recess a part of the store front as shown in FIG. 1, which requires that adjacent panels extend at different angles, or by reason of the desire to limit the maximum size of the panels employed. Division bars, corner bars and reverse corner bars are provided herein which are of novel construction and which serve to interconnect the adjacent panels and span the adjacent edges thereof. The construction illustrated in FIG. 2 discloses a division bar for interconnecting adjacent marginal portions of a pair of coplanar glass panels 14 whose upper and lower margins are anchored by any suitable means, such as the inner member 60 of the sash and the outer member 24 of the sash. The division bars consist of two moldings, namely an inner molding 80 and an outer molding 82. The inner molding 80 is essentially of channel shape having a web portion 84 and a pair of leg portions 86 which extend at an angle to the web 84 and which are provided with longitudinal grooves 88 in their outer faces preferably adjacent to the web 84. A pair of flanges 90 project perpendicularly from the web 84 in substantially equispaced relation to the channel legs 86 and spaced from one another to define guides terminating inwardly relative to the edges of legs 86.

The outer molding 82 of the division bar is essentially of channel shape and preferably includes a web portion 92 and a pair of short channel legs 94 whose free edges are spaced apart substantially the same distance as the free edges of the channel legs 86 of the inner channel 80. A central flange 96 extends perpendicular to the channel web 92 and projects beyond the plane of the free edges of channel legs 94. Flange 96 preferably terminates in an enlarged longitudinal head portion 98 of a transverse dimension to be received with a snug sliding fit between the flanges 90 of the inner member 80 of the division bar. Screws or other securing members 100 are passed through openings in the web 84 of the inner member of the division bar and are screw-threaded in apertures in the enlarged head 98 to draw the member 82 toward the member 80 for the purpose of gripping the margins of the glass panels 14 between the edges of the confronting aligned channel legs 86 and 94. The edges of the flanges 90 are preferably beveled as are the corners of the head 98 to facilitate interengagement of these parts, and the edges of the flanges 86 and 94 may be rounded or of any other desired configuration suitable for safely engaging a glass panel.

The anchorage of the division, corner and reverse corner bars with respect to the sash members or structual parts of a building by anchor members engaging the ends of the division, corner and reverse corner bars is illustrated in FIG. 8. The anchor members include base portions or flanges 102 adapted to be secured to a support, such as member 56 or other building structural part by securing members 104. The anchor member has a substantially channel shaped body extending perpendicular to the base 102 and preferably including a web portion 106 and a pair of leg portions 108 so spaced and arranged as to receive snugly between them the inner member 80 of the division, corner or reverse corner bars. The legs 108 of the anchor member have inward projections 110 extending parallel to each other and configured to snugly and slidably fit in the groove 88 of the molding 80.

It will be evident that the inner member of the division, corner or reverse corner bars can be secured in place very easily by applying the bar anchors at opposite ends thereof in interfitting engagement with the grooves 88 receiving the projection 110 and then placing the assembly in proper position and anchoring the same by the use of securing means 104. Then the panels 14 are applied in place, members 82 of the division, corner or reverse corner bars are properly oriented to the inner members 80 of the division, corner or reverse corner bars, and the securing means 100 are used to assemble and maintain said bar members in proper supporting and clamping engagement with the marginal portions of the adjacent window panes.

Figure 3:
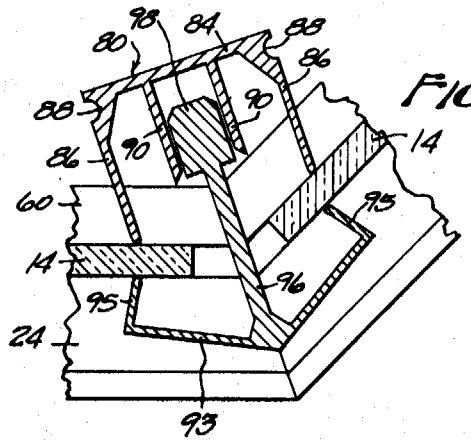
FIG. 3 is an enlarged horizontal detail sectional view taken on line 3—3 of FIG. 1.

The construction illustrated in FIG. 3 uses the same inner member 80 of a division, corner or reverse corner bar which has been described above for use in joining together adjacent marginal portions of a pair of glass panels 14 which extend at an angle to each other. In this instance the outer member of the corner bar is of slightly different shape at the outer part thereof in that its web portion 93 is substantially V-shaped in cross-section and its flanges 95 are arranged in inwardly converging relation so that their free edges abut the glass panels 14 opposite the edges of the flanges 86 of the inner member 80. The outer molding of the corner bar has the same central connecting bar 96 with enlarged head 98 received between the guide flanges 90 of the inner member 80 of the division, corner or reverse corner bar.

Figure 2:
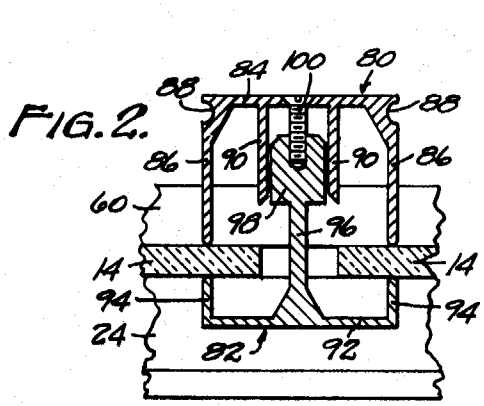
FIG. 2 is an enlarged horizontal sectional detail view taken on line 2—2 of FIG. 1.

FIG. 4 illustrates the use of the same inner member 80 and outer member 82 of the division, corner of reverse corner bar as shown in FIG. 2 for use in clamping the marginal edges of glass panels 14 arranged at right reverse angles to each other. The same parts bear the same reference numerals and cooperate in the same manner, although in this instance it will be observed that the glass-engaging flanges 86 and 94 extend at an acute angle to the glass panes which they engage.

In some instances the angles between the adjacent glass panels 14 to be supported by division, corner or reverse corner bars, or the structural characteristics of the building, are such that the dimensions of the parts illustrated in FIG. 2 must be modified. Thus in FIG. 9 is illustrated a construction wherein the inner division, corner or reverse corner bar molding has its legs 86' and its guide flanges 90' elongated compared to the same parts of the division, corner or reverse corner bar molding 80, and similarly the central projecting flange 96' of the outer division, corner or reverse corner bar is elongated. In such instances it may also be desirable to provide lateral flanges 112 on bar 96' spaced from the enlarged head 98 and adapted to have a snug sliding fit between the flanges 90' to facilitate proper orientation of the inner division, corner or reverse corner molding 80' and the outer division, corner or reverse corner bar molding 82'.

In order to make it possible to set double pane insulating glass at any selected angle at outside angles and reverse angles, a construction of the character illustrated in FIG. 10 is employed. In this instance the double glass panels are held in sash constructions of substantially the same character illustrated in FIG. 7, similar parts bearing similar reference numerals. While the anchor spring has not been illustrated in FIG. 10, such an anchor spring is used and will be of substantially the same construction illustrated in FIG. 7 or of any other type which will serve the intended purpose.

In this construction a substantially tubular corner molding 120 is provided, the same being of circular cross-sectional shape through the major part of its extent and being characterized by flanges 122 projecting outwardly therefrom in substantially radial direction. One of these flanges carries an inwardly directed flange 124 extending lengthwise and at an acute angle thereto and forming a base against which the base plate 66 of the adjacent inner sash member is secured as by securing screws 126. The other flange 122 has projecting therefrom a flange 128 against which portion 59 of the wall 58 of the inner member of the sash, which may be offset as shown in FIG. 10, is adapted to engage. A shoulder 130 may be provided on the part 128 substantially coplanar with the flange 124 to support the edge of the member 59. The member 120 may be likened to a knuckle and cooperates with a socket member 132 which is provided with a concave surface 134 extending lengthwise thereof and of a curvature conforming to the curvature of the outer surface of the knuckle member 120. The member 132 preferably has a flat base surface 136 against *which* the base flange 66 of the adjacent inner member of the window sash may be anchored by securing member 138, and if desired, a flange 140 may project from the member 132 for engagement with the outer surface of the flange 59 of the inner member of the sash, as shown.

It will be apparent that the construction illustrated in FIG. 10 makes possible the positioning of the dual insulating glass panels 50 at any angle to each other within a wide range, such as a range of 270 degrees or more, and that the only requirement with respect to these parts is that the apertures in the knuckle 120 which receive the securing members 138 be drilled on the job or else predrilled to accurate position for proper angular orientation between the flange 124 of the knuckle 120 and the surface 136 of the socket member 132. Observe in this connection that the construction also makes possible the use of spring locked sash, such as illustrated in FIG. 7, to clamp the margin of the insulated double glass panels rather than relying upon the use of securing screws, as illustrated in FIG. 2, which might be subjected to injuring the double glass panel if tightened to an excessive extent.

The construction illustrated in FIG. 5 is particularly useful for the purpose of connecting a glass panel extending at an angle to the plane of a door to the frame of that door or for connecting a glass panel at an angle to any part of a building. In this connection a door frame 150 will preferably be formed of tubular metal of substantially rectangular cross-sectional shape. A swivel adapter 152 in the nature of a structural member of arcuate cross-sectional shape is positioned to fit upon a corner of the door frame 150 to cooperate therewith to define a post with the opposite longitudinal edges thereof bearing against perpendicularly disposed surfaces of the frame member 150. Substantially centrally of the member 152 is provided a pair of integral converging longitudinal flanges 154 which bear against the outer surfaces of the adjacent walls 150 at a corner defined thereby. Thus a four point contact is provided between the swivel adapter 152 and the door frame 150 to properly orient the parts. A channel adapter cooperates with the swivel adapter and preferably comprises a structural member of channel cross-section having a web portion 156 and a pair of leg portions 158. Suitable securing means may be employed to interconnect these parts in such a manner that the edges of the legs 158 will bear against circumferentially spaced longitudinal linear parts of the exterior surface of the swivel adapter 152. Thus in FIG. 5 a securing member 160 has been illustrated as passing through the parts 156 and 152 to connect the same. In order to avoid an angular hole in the door frame member 150, a securing screw 161 is passed through the member 152 at a point spaced from the part 154 to enter a tapped hole extending perpendicularly through a wall of a door frame 150 spaced from a corner thereof. Such a securing member 161 may be preferably located at a position which is concealed by the adapter 158 when the parts are assembled. The base plate 66 of the inner member of the sash will be secured to the web 156 by suitable securing means 162. A spring 76 will serve to anchor the outer member 24, 30 of the sash to the inner member 58, 60 of the sash.

Figure 11:
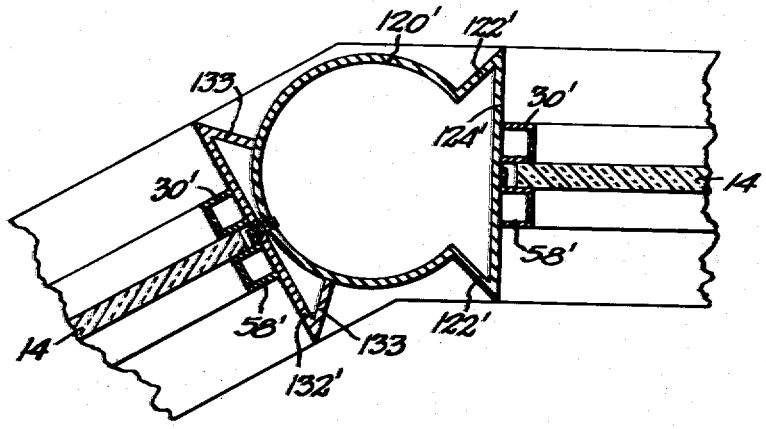
FIG. 11 is an enlarged horizontal sectional view similar to FIG. 10 but illustrating a modification of the construction.

The construction illustrated in FIG. 11 shows a slight modification of the construction illustrated in FIG. 10 and used for the positioning of plate glass panels 14, or a window having two spaced panels 50, mounted between outer stops 30' and inner stops 58' or between outer and inner members of a sash. In this construction the tubular corner molding or post 120' is substantially similar to the corner molding 120 previously described, being characterized by a circular cross-sectional shape through the major part of its extent and by flanges 122' projecting outwardly therefrom in substantially radial directions, and in this instance being interconnected by a base flange 124'. The stops 30' and 58', or sash members, are suitably connected to the base 124'. A socket member 132' cooperates with the tubular member 120' and is here illustrated as being formed of substantially channel shape, having a continuous base against which the stops 30' and 58', or sash members, abut and to which they are secured and also having flanges 133 projecting therefrom in diverging relation to engage the outer surface of the tubular part 120'.

Figure 12:
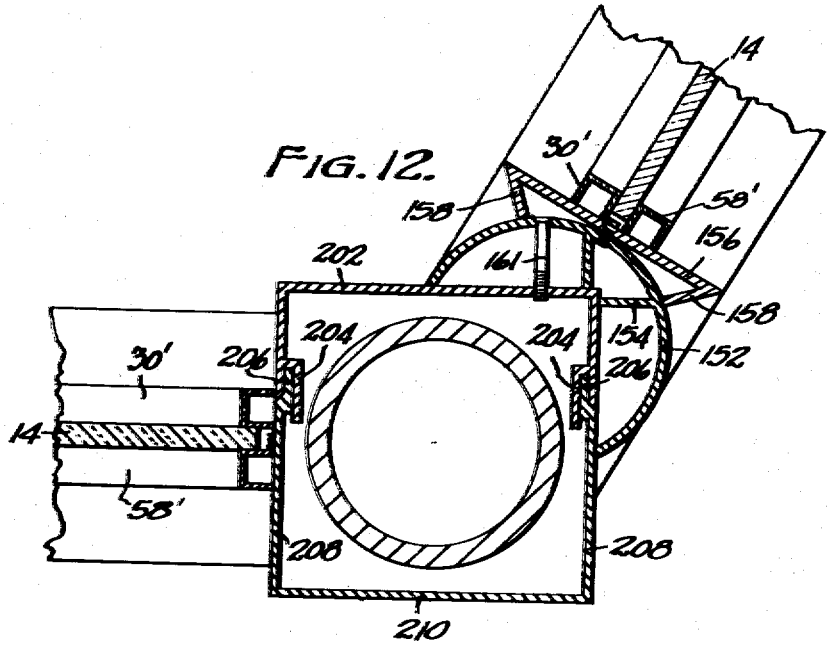
FIG. 12 is an enlarged horizontal detail sectional view illustrating a modification of the construction and being taken on line 3—3 of FIG. 3.

The construction illustrated in FIG. 12 is a variation of the construction illustrated in FIG. 5 and is intended primarily for use in connection with any arrangement known in the art as a curtain wall construction wherein vertical tubular or channel members of any desired configuration and construction are provided at spaced points along a building surface and glass or other panels extend between said members and at selected angles to said members and to adjacent panels. As here shown, a tubular member has an inner molding 202 of substantially channel shape whose legs are characterized by inwardly offset flanges 204 adjacent their free ends and define channels to receive offset ends 206 of the legs 208 of an opposite channel 210. The two channels 202 and 210 cooperate and define a post of substantially rectangular cross-section. Swivel adapter 152 is secured to this rectangular cross-section structure 202, 210 in substantially the same manner as illustrated in FIG. 5 to form a part of an assembled post, and channel adapter 156, 158 is associated therewith also in the manner illustrated in FIG. 5.

This store front construction has the outstanding advantage of requiring a minimum number of different parts to construct store fronts of different shapes, sizes and configurations. Thus the number of parts which must be stocked is small compared with the number of parts which are now conventionally stocked by store front manufacturers and distributors. At the same time all of the advantages of safe anchorage of glass, architecturally pleasing appearance, minimum cost, and other considerations which are desirable in store fronts, are preserved and maintained in this construction.

While the preferred embodiments of the invention have been illustrated and described, it will be understood that changes in the construction may be made within the scope of the appended claims without departing from the spirit of the invention.

I claim:

1. In a store front construction for mounting a glass panel within a window opening, a multiple part corner bar outlining a part of said window opening, a sash structure embracing the marginal portions of said panel adjacent said bar, one of said bar parts constituting a post having a curved portion of longitudinally uniform exteriorly convex cross-section, the other bar part constituting a channel having a base portion and a pair of flange portions having parallel edges spaced apart a distance less than the width of the convex curved portion of said post, means securing said bar parts together in selected angular relation with the edges of said flange portions abutting said curved convex portion of said post, and means securing said sash structure to the base portion of said channel, said post constituting a member of rectangular cross-section and a member of C-shaped cross-section defining said curve convex portion and secured to said rectangular member with its longitudinal edges in engagement therewith.

2. In a store front structure for mounting a glass panel within a window opening, a tubular post outlining a part of said window opening, a sash structure embracing the marginal portion of said panel adjacent said post, an adapter of channel section having a base portion mounting said sash structure and having spaced flanges terminating in parallel edges, a second adapter secured to said post and having a longitudinally uniform convex curved exterior surface with parallel edges spaced apart a distance greater than the spacing of the edges of the flanges of said first adapter, means for securing said second adapter to said post with its parallel edges in contact with said post, means for securing said adapters together with the parallel edges of the first adapter in contact with the curved exterior surface of said second adapter, and means securing said sash structure to the base of said first adapter.

*3. A building construction for mounting a building panel in an opening, a multiple part corner bar outlining part of said opening, a sash structure carried by a part of said bar and embracing the marginal portion of said panel adjacent said bar, one of said bar parts constituting a post having a longitudinal knuckle portion of uniform exteriorly convex substantially circular cross-section and more than 180° in cross-sectional extent and spaced symmetrical longitudinal shoulders extending divergently substantially radially from opposite longitudinal margins of said knuckle portion substantially imperforate means connecting the outer marginal portions of said shoulders, the other bar part constituting an elongated socket embracing a part of said knuckle portion and having an outer base portion spaced from said knuckle portion and outer side surfaces extending convergently from said base portion, said socket including knuckle-engaging edge surface portions adjacent said side surfaces and spaced apart a distance less than the width of the knuckle portion, and means securing said bar parts together in selected angular relation with the post-engaging edge portions of said socket in contact with the convex knuckle portion of said post, each side surface of said socket being complementary to the shoulders of said post adjacent thereto and adapted for face engagement with said adjacent shoulder in one angular position of said bar parts.*

*4. A building construction for mounting a building panel in an opening, a multiple part corner bar outlining part of said opening, a sash structure carried by a part of said bar and embracing the marginal portion of said panel adjacent said bar, one of said bar parts constituting a hollow post having a longitudinal knuckle portion of longitudinally uniform substantially circular C-shape in cross-section and more than 180° in cross-sectional extent and spaced symmetrical longitudinal flanges extending divergently substantially radially from opposite longitudinal margins of said C-shaped portion substantially imperforate means connecting the outer marginal portions of said shoulders, the other bar part constituting an elongated channel embracing a part of said knuckle portion and having a base portion and a pair of flange portions having parallel edges spaced apart a distance less than the width of the C-shaped portion of said post, and means securing said bar parts together in selected angular relation with the edges of said flange portions abutting the C-shaped portion of said post.*

*5. A building construction as defined in claim 4, wherein each flange of said channel is complementary to the adjacent flange of said post and adapted for face engagement therewith in one angular position of said bar parts.*

*6. A building construction as defined in claim 4, wherein the base portion of said channel contacts the C-shaped portion of said post between and spaced from said channel flanges.*

References Cited in the file of this patent or the original patent

UNITED STATES PATENTS

| | | |
|---|---|---|
| 1,199,357 | Evans | Sept. 26, 1916 |
| 1,893,956 | Michaels | Jan. 10, 1933 |
| 2,144,515 | Trumpbour | Jan. 17, 1939 |
| 2,312,179 | Lowry | Feb. 23, 1943 |